United States Patent [19]
Muller et al.

[11] 3,935,177
[45] Jan. 27, 1976

[54] POLYMERISATION AND COPOLYMERISATION OF DIENES

[75] Inventors: Eberhard Müller; Günter Marwede, both of Leverkusen, Germany

[73] Assignee: Bayer Aktiengesellschaft, Germany

[22] Filed: Nov. 6, 1974

[21] Appl. No.: 521,465

[30] Foreign Application Priority Data
Nov. 9, 1973 Germany............................ 2355941

[52] U.S. Cl............ 260/84.7; 260/94.6; 260/94.2 M
[51] Int. Cl.² ........................................... C08D 1/20
[58] Field of Search............ 260/94.6, 94.2 M, 84.7; 450/685

[56] References Cited
UNITED STATES PATENTS

| | | | |
|---|---|---|---|
| 2,849,432 | 8/1958 | Kibler et al. ...................... | 260/94.2 |
| 3,324,191 | 6/1967 | Wofford......................... | 260/94.6 X |
| 3,536,679 | 10/1970 | Langer........................... | 260/94.6 X |
| 3,647,803 | 3/1972 | Schlott et al. .................. | 260/94.6 X |

*Primary Examiner*—William F. Hamrock
*Attorney, Agent, or Firm*—Connolly and Hutz

[57] ABSTRACT

Process for the homopolymerisation and copolymerisation of conjugated dienes in inert organic solvents on alkali metal amides as catalysts in the presence of a solvating agent for the amide.

9 Claims, No Drawings

POLYMERISATION AND COPOLYMERISATION OF DIENES

This invention relates to a process for the homo- or co-polymerisation of dienes in an inert organic solvent using an alkali metal amide as catalyst and in the presence of solvating agents for the alkali metal amides.

It is known to polymerise butadiene on organo-lithium compounds, e.g. corresponding to the formula
RLi (r = alkyl or aryl)
The structure of the polymers obtained in this way may be influenced by the addition of Lewis bases, e.g. ethers (see J. Polym. Sci. 42, 299 (1960); and German Offenlegungsschrift No. 1,958,650.

In this polymerisation, the molecular weight and micro-structure of the polymer depend on the quantity of of catalyst used. If the polymer is required to have a high molecular weight, only very small quantities of catalyst may be used. Furthermore, organo-lithium compounds are inactivated by impurities in the monomer and in the solvent. Small quantities of such impurities are always present. The amount thereof cannot be kept constant. The effective quantity of catalyst therefore varies from one polymerisation batch to another and, accordingly, the molecular weight and micro-structure of the polymers also vary. Polymers with high molecular weights, which require low catalyst concentrations, are virtually impossible to prepare reproducibly.

It is also known to polymerise conjugated dienes on lithium amides, either in the absence of solvent or in an inert solvent, (see U.S. Pat. No. 2,849,432). Lithium amide is only very sparingly soluble in the monomers and in the conventional inert organic solvents. Since only the dissolved portion of the lithium amide acts as a catalyst, the effective quantity of catalyst depends on the solubility of the lithium amide in the polymerisation system. It is customary to employ an excess of lithium amide so that undissolved lithium amide is available and any dissolved lithium amide used up by side-reactions is automatically dissolving a corresponding quantity replaced by. The quantity of active catalyst is thus kept constant so that the properties of the polymer made are also constant. However, the quantity of active catalyst is invariable and the properties of the product are therefore also invariable.

The present invention is based on the discovery that the effective quantity of alkali metal amide catalyst used in the polymerisation and copolymerisation of conjugated dienes in inert organic solvents can be selected as desired within wide limits if a solvating agent for the amide is added. The quantity of amide which dissolves in the polymerisation mixture is determined by the quantity and nature of the solvating agent used. If the amide is present in excess, so that undissolved amide is present, any dissolved amide consumed by side-reactions is automatically replaced by dissolving the appropriate further quantity of amide. The concentration and quantity of active catalyst is therefore constant. The concentration of active catalyst is predetermined by the quantity and nature of the solvating agent used and hence the molecular weight and micro-structure of the polymer may be varied in a reproducible manner by varying amount and nature of the solvating agent. Since the solubility of the amide also depends on the temperature, the nature of polymer may be further influenced by altering the reaction temperature during polymerisation.

This invention therefore relates to a process for the homo- or copolymerisation of conjugated dienes in inert organic solvents, wherein the catalyst is an alkali metal amide and wherein a solvating agent for the alkali metal amide is present.

Monomers which are particularly suitable for the process are non-cyclic conjugated dienes containing from 4 to 8 carbon atoms, such as butadiene. These dienes may also be copolymerised with aromatic vinyl compounds, such as styrene and its derivatives. The polymer may contain any proportion of diene units and aromatic vinyl units, but, as a general rule, not more than 40 % of the monomer units in the copolymer should be units of aromatic vinyl compounds.

Particularly suitable alkali metal amides are those corresponding to the general formula:

wherein R and R' independently represent $C_3 - C_{20}$ alkyl, $C_5 - C_7$ cycloalkyl, or $C_6 - C_{10}$ aryl;
Me represents lithium, sodium or potassium.

Particularly suitable alkali metal amides are, e.g. lithium dipropylamide, lithium dibutylamide, lithium dicyclohexylamide, lithium diphenylamide, N-lithium-N-methyl anilide, N-lithium-N-ethyl anilide, sodium dipropylamide, potassium dibutylamide and N-sodium-N-methyl anilide. These amides may be prepared in conventional manner by reacting alkali metal alkyls or alkali metal-naphthalene components with the appropriate secondary amides in organic solvents.

The solvating agents used are preferably selected from diethers, such as dimethoxy ethane and tertiary aliphatic diamines such as N,N,N',N'-tetramethyl-ethylene diamine.

The quantity of solvating agent required is — depending on structure and molecular weight of the desired polymer — from 0.01 to 3 % by weight, based on the monomer. The alkali metal amide is generally added in such an amount that part of it remains undissolved (e.g. from 0.01 to 1 % by weight, based on the monomer). Polymerisation itself is carried out in the conventional inert organic solvents, e.g., in aliphatic or aromatic hydrocarbons. Particularly suitable solvents are e.g. n-hexane, cyclohexane, benzene, toluene, xylene and mixtures thereof. The polymerisation temperature employed is generally from 0° to 60°C, most preferably from 15° to 40°C.

The polymerisation process is carried out in a way conventional for organo-metallic catalysts. Preferably, a solution of the alkali metal amide in a mixture of solvent and solvating agent is first prepared and the monomer is then added to this solution, in the absence of air and moisture. After termination of polymerisation, the catalysts may be inactivated in the conventional manner. The solid polymer can be recovered by precipitation or by steam distillation.

The products obtained are vulcanisable rubbers.

EXAMPLES

The following Examples are carried out in anhydrous solvents under a pure nitrogen atmosphere. The polymers obtained are isolated from the polymerisation solution by precipitation with methanol and stabilised with 2,2'-methylene-bis-6-t-butyl-4-methyl phenol.

EXAMPLE 1

A. Preparation of the catalyst:

4 ml n-butyl-lithium solution and 1.2 ml dipropylamine are added to 400 ml toluene and the mixture is stirred for 15 minutes at 20°C with exclusion of air and moisture.

A suspension of lithium dipropylamide is obtained.

B. Polymerisation:

1 liter toluene, 20 ml triethylamine and 200 ml butadiene are added to the solution obtained according to part A above and stirred at a temperature of from 20° to 40°C for 20 hours.

A polybutadiene with an intrinsic viscosity of $\eta = 150$ ml/g is obtained in a yield of 100% by the working up of the reaction solution. IR spectroscopic analysis shows that the product contains 37.6% 1,2 units; 23.5% cis-1,4 units and 38.9% trans-1,4 units.

C. Comparison experiment:

4 ml n-butyl-lithium solution, 20 ml triethylamine and 200 ml butadiene are added to 1.4 liters toluene and mixture is stirred at a temperature of from 20° to 40°C for 20 hours. A polybutadiene with an intrinsic viscosity of $\eta = 48$ ml/g is obtained in virtually 100% yield when the reaction mixture is worked-up. IR spectroscopic analysis of the structure shows that the product contains 43.2 % 1,2 units; 22.7 % cis-1,4 units and 34.1 % trans-1,4 units.

EXAMPLE 2

A. Preparation of the catalyst:

40 ml n-butyl lithium and 11.6 ml dipropylamine are added to 20 l toluene and the mixture is stirred for 15 minutes at 20°C with the exclusion of air and moisture. A suspension of lithium dipropylamide is obtained.

B. Polymerisation:

100 ml triethylamine and 5 l butadiene are added to this solution and stirred at room temperature for 24 hours. A polybutadiene with an intrinsic viscosity of $\eta = 380$ ml/g is obtained when the reaction mixture is worked-up. It contains 30 % 1,2 units; 30 % cis-1,4 units; and 40 % trans-1,4 units.

EXAMPLE 3

Example 1 is repeated, but this time 0.1 ml N,N,N',-N'-tetramethyl-ethylene-diamine are added instead of 20 ml triethylamine. A polybutadiene with an intrinsic viscosity of $\eta = 134$ ml/g is obtained in virtually 100 % yield when the reaction mixture is worked-up. IR-spectroscopic analysis of the structure shows that the product contains 57.7 % 1,2 units; 19,2 % cis-1;4 units and 23.1 % trans-1,4 units.

EXAMPLE 4

A. Preparation of the catalyst:

1 g naphthalene, 0.62 g potassium and 2.2 ml dipropylamine are added to 20 ml tetrahydrofuran and stirred until the potassium has undergone complete reaction. A complex of potassium dipropylamide and tetrahydrofuran is obtained.

B. Polymerisation:

1.4 l benzene and 200 ml butadiene are added to this complex and stirred for 20 hours at 20°C. The polybutadiene obtained has an intrinsic visosity of $\eta = 180$ ml/g. It contains 56% 1,2 units; 12.2% cis-1,4 units and 31. 8% trans-1,4 units.

EXAMPLE 5

A. Preparation of the catalyst:

2.5 g cyclohexylamine and 12.5 ml n-butyl lithium are added to 200 ml toluene and stirred for 15 minutes at 20°C. A suspension of lithium dicyclohexylamide is obtained.

B. Polymerisation:

20 ml tetrahydrofuran, 1 l toluene and 200 ml butadiene are added to this solution and stirred at a temperature of from 20° to 60°C for 20 hours. The polybutadiene, which is obtained in a yield of almost 100%, has an intrinsic visocosity of $\eta = 60$ ml/g. It contains 66% 1,2 units; 15.5% cis-1,4 units and 18.5% trans-1,4 units.

EXAMPLE 6

Example 5 is repeated, but using 20 ml tri-n-butylamine instead of tetrahydrofuran. The polybutadiene obtained has an intrinsic viscosity of $\eta = 80$ ml/g. It contains 21.5% 1,2 units; 36% cis-1,4 units and 42.5% trans-1,4 units.

EXAMPLE 7

0.14 g sodium dipropylamide and 20 ml tetrahydrofuran are added to 1.4 l toluene. A mixture of 200 ml butadiene and 20 ml styrene is added at 20°C and the polymerisation mixture is stirred for 20 hours. A statistic copolymer of styrene and butadiene having an intrinsic viscosity of $\eta = 120$ ml/g is obtained in a yield of almost 100 %. The product contains 16.4 % styrene units, 39.4 % 1,2-butadiene units and 44.2 % trans-1,4-butadiene units.

The experiment is repeated but the styrene is added only after the butadiene had polymerised. The result is a corresponding block copolymer.

EXAMPLE 8

A. Preparation of the catalyst:

1.5 ml dipropylamine, 5 ml n-butyl lithium and 10 ml tetrahydrofuran are added to 100 ml toluene and stirred for 15 minutes. A tetrahydrofuran complex of potassium dipropylamide is obtained.

B. Polymerisation:

1 l toluene and 200 ml isoprene are added to this solution and stirred for 20 hours.

The polyisoprene, which is obtained in a yield of almost 100 % contains 45 % 3,4-isoprene units.

EXAMPLE 9

A. Preparation of the catalyst:

4 ml n-butyl-lithium solution and 1.38 ml di-i-butylamine are added to 1 l n-hexane and the mixture is stirred for 15 minutes at 20°C with exclusion of air and moisture. A solution of lithium di-i-butylamide is obtained.

B. Polymerisation:

0.12 ml N,N,N',N'-tetramethyl-ethylene-diamine and 400 ml butadiene are added to the solution obtained according to part (A) above and stirred at a temperature of from 20° to 40°C for 20 hours. A polybutadiene with an intrinsic viscosity of $\eta = 84$ ml/g is obtained in a yield of 100 % by the working up of the reaction solution. IR spectroscopic analysis shows that the product contains 64.0 % 1,2 units; 17.3 % cis-1,4-units and 18.8 % trans1,4- units.

EXAMPLE 10

Example 9 is repeated, but this time 0.1 ml dimethoxy ethane are added instead of 0.12 ml N,N,N',N'-tetramethyl-ethylene-diamine. A polybutadiene with an intrinsic viscosity of $\eta = 90$ ml/g is obtained in virtually 100 % yield when the reaction mixture is worked-up. IR spectroscopic analysis of the structure shows that the product contains 62.1 % 1,2 units; 18.5 % cis-1,4 units and 19.4 % trans-1,4 units.

EXAMPLE 11

A. Preparation of the catalyst:
   20 ml n-butyl-lithium solution and 5.5 ml dipropylamine are added to 20 l n-hexane and the mixture is stirred for 15 minutes at 20°C. A suspension of lithium dipropylamide is obtained.
B. Polymerisation:
   5 ml N,N,N',N'-tetramethyl-ethylene-diamine and 6 l butadiene are added to the mixture obtained according to part A) above and stirred at a temperature of from 20° to 40°C for 20 hours. A polybutadiene with an intrinsic viscosity of $\eta = 218$ ml/g is obtained in a yield of 100 % by the working up of the reaction solution. IR spectroscopic analysis shows that the product contains 62 % 1,2 units; 17.3 % cis-1,4 units and 20.7 % trans-1,4 units.

We claim:

1. A process for the homo- or copolymerisation of conjugated dienes, which comprises contacting at least one conjugated diene in an inert organic solvent with a catalytic amount of a catalyst consisting of an alkali metal amide of the formula:

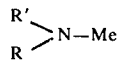

wherein R and R', which may be the same or different, are $C_3 - C_{20}$ alkyl, $C_5 - C_7$ cycloalkyl, or $C_6 - C_{10}$ aryl and Me is lithium, sodium or potassium, in the presence of a solvating agent for the catalyst selected from the group consisting of diethers, tertiary aliphatic diamines, triethylamine and tetrahydrofuran.

2. The process as claimed in claim 1 in which the diene contains from 4 to 8 carbon atoms.

3. The process as claimed in claim 2 in which the diene is butadiene.

4. The process as claimed in claim 1 in which the diene is copolymerised with an aromatic vinyl compound.

5. The process as claimed in claim 4 in which the aromatic vinyl compound is styrene.

6. The process as claimed in claim 1 in which the alkali metal amide is lithium dipropylamide, lithium dibutylamide, lithium dicyclohexylamide, lithium diphenylamide, N-lithium-N-methyl anilide, N-lithium-N-ethylanilide, sodium dipropylamide, potassium dibutylamide or N-sodium-N-methyl anilide.

7. The process as claimed in claim 1 in which the solvating agent is dimethoxy ethane or N,N,N',N'-tetramethyl-ethylenediamine 8. The process as claimed in claim 1, in which the solvating agent is present in an amount of from 0.01 to 3 % by weight based on the conjugated diene.

9. The process as claimed in claim 1 in which the alkali metal amide is present in an amount of from 0.01 to 1 % by weight, based on the conjugated diene.

* * * * *